(12) United States Patent
Haber (10) Patent No.: US 10,065,601 B2
(45) Date of Patent: Sep. 4, 2018

(54) PORTABLE, SELF-CONTAINED ANTI-THEFT VEHICLE ALARM SYSTEM WITH AUTOMATIC PROXIMITY CONTROL

(71) Applicant: Babaco Alarm Systems Inc., Moonachie, NJ (US)

(72) Inventor: Greg Haber, Woodbury, NY (US)

(73) Assignee: BABACO ALARM SYSTEMS INC., Moonachie, NJ (US)

( * ) Notice: Subject to any disclaimer, the term of this patent is extended or adjusted under 35 U.S.C. 154(b) by 0 days.

(21) Appl. No.: 15/417,318

(22) Filed: Jan. 27, 2017

(65) Prior Publication Data

US 2017/0136989 A1 May 18, 2017

Related U.S. Application Data

(63) Continuation-in-part of application No. 14/700,913, filed on Apr. 30, 2015.
(Continued)

(51) Int. Cl.
*B60R 25/10* (2013.01)
*B60R 25/24* (2013.01)
(Continued)

(52) U.S. Cl.
CPC ...... *B60R 25/1004* (2013.01); *B60R 25/1003* (2013.01); *B60R 25/102* (2013.01); *B60R 25/1018* (2013.01); *B60R 25/245* (2013.01); *B60R 25/302* (2013.01); *B60R 25/33* (2013.01); *B60R 2025/1013* (2013.01)

(58) Field of Classification Search
CPC ..... B60R 25/33; B60R 25/102; B60R 25/245; B60R 25/302; B60R 25/305; B60R 25/1004; B60R 25/1018; B60R 25/1003; B60R 2025/1013; B60K 28/12
See application file for complete search history.

(56) References Cited

U.S. PATENT DOCUMENTS 4,897,630 A * 1/1990 Nykerk ............... B60R 25/04
340/309.16
5,357,560 A * 10/1994 Nykerk ............... B60R 25/1003
340/426.17
(Continued)

FOREIGN PATENT DOCUMENTS

DE 102006048161 A1 * 4/2008 ......... B60R 25/1018

*Primary Examiner* — Adnan Aziz
(74) *Attorney, Agent, or Firm* — Epstein Drangel LLP; Robert L. Epstein (57) ABSTRACT

The components of the alarm system are fully enclosed within a portable housing and require no external power or data signal connections. A mobile transmitter generates a proximity signal indicating a given range from the vehicle. An audible alarm signal and a GPS location signal are generated in response to the output of one or more sensors indicating a particular occurrence, if a transmitter is outside of the given range, indicating that the driver has left the vehicle unattended and vulnerable to attack. When the vehicle is driven by an authorized driver having the transmitter, the received proximity signal indicates that the driver is within the given range, preventing the generation of the audible alarm resulting from sensors being triggered by shifting cargo in the cargo compartment resulting from vehicle movement and irregular road surface conditions during transit.

18 Claims, 6 Drawing Sheets

Related U.S. Application Data (60) Provisional application No. 61/986,963, filed on May 1, 2014.

(51) Int. Cl.
*B60R 25/30* (2013.01)
*B60R 25/33* (2013.01)
*B60R 25/102* (2013.01)

(56) References Cited

U.S. PATENT DOCUMENTS

| | | | | |
|---|---|---|---|---|
| 5,463,371 A * | 10/1995 | Fuller | | B60R 25/1001 116/33 |
| 5,917,433 A * | 6/1999 | Keillor | | G08G 1/20 340/540 |
| 5,963,131 A * | 10/1999 | D'Angelo | | G08B 13/1409 340/328 |
| 6,133,830 A * | 10/2000 | D'Angelo | | G08B 13/1409 340/539.1 |
| 6,624,760 B1* | 9/2003 | Kinzel | | H04Q 9/00 340/539.1 |
| 7,068,151 B2* | 6/2006 | Giles | | B60R 25/00 307/10.2 |
| 7,218,215 B2* | 5/2007 | Salisbury | | G06Q 10/08 235/385 |
| 7,333,015 B2* | 2/2008 | Ekstrom | | B65D 90/00 340/545.1 |
| 7,834,757 B2* | 11/2010 | Rodgers | | B60R 25/1004 340/431 |
| 2004/0095227 A1* | 5/2004 | Lehman | | B60R 25/102 340/425.5 |
| 2004/0233055 A1* | 11/2004 | Canich | | G06Q 10/08 340/539.26 |
| 2005/0073406 A1* | 4/2005 | Easley | | G08B 25/10 340/539.1 |
| 2005/0110635 A1* | 5/2005 | Giermanski | | G07C 5/0858 340/539.22 |
| 2005/0134457 A1* | 6/2005 | Rajapakse | | B65D 90/22 340/545.6 |
| 2005/0179545 A1* | 8/2005 | Bergman | | G08B 13/08 340/545.2 |
| 2006/0187035 A1* | 8/2006 | Adams | | G08B 5/00 340/545.2 |
| 2006/0250230 A1* | 11/2006 | Fischer | | B60R 25/1004 340/500 |
| 2007/0188321 A1* | 8/2007 | Stenlund | | B60R 25/1004 340/539.26 |
| 2008/0036595 A1* | 2/2008 | Hollstien | | G08B 13/00 340/541 |
| 2008/0042809 A1* | 2/2008 | Watts | | B60R 25/1003 340/426.16 |
| 2008/0136914 A1* | 6/2008 | Carlson | | G08B 7/06 348/155 |
| 2008/0179908 A1* | 7/2008 | Haber | | B60R 25/1004 296/37.6 |
| 2008/0282817 A1* | 11/2008 | Breed | | B60C 11/24 73/865.9 |
| 2009/0009346 A1* | 1/2009 | Hojmose | | G08B 7/06 340/628 |
| 2009/0122144 A1* | 5/2009 | Latham | | G08B 13/19632 348/155 |
| 2009/0203349 A1* | 8/2009 | Hollstien | | G08B 25/016 455/404.1 |
| 2009/0289790 A1* | 11/2009 | Issokson | | G08B 13/189 340/552 |
| 2010/0032332 A1* | 2/2010 | Davis | | G08B 13/1436 206/459.1 |
| 2011/0175730 A1* | 7/2011 | Stevenson | | E05B 47/00 340/540 |
| 2015/0114861 A1* | 4/2015 | Heim | | E05G 1/005 206/317 |
| 2015/0360645 A1* | 12/2015 | Guarneri | | B60R 25/045 340/426.11 |

* cited by examiner

PORTABLE, SELF-CONTAINED ANTI-THEFT VEHICLE ALARM SYSTEM WITH AUTOMATIC PROXIMITY CONTROL

CROSS-REFERENCE TO RELATED APPLICATIONS

This Patent Application is a continuation-in-part of patent application Ser. No. 14/700,913, filed Apr. 30, 2015, which claims priority on Provisional Patent Application No. 61/986,963, filed May 1, 2014, the contents of which are incorporated herein in their entirety by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to anti-theft alarm systems for protecting cargo stored or transported in vehicle cargo compartments, and more particularly to a portable and entirely self-contained anti-theft alarm system with automatic proximity control which prevents false alarms resulting from shifting cargo in the cargo compartment caused by vehicle movement and vibrations from irregular road surfaces during transit.

2. Description of Prior Art Including Information Disclosed Under 37 CFR 1.97 and 1.98

Anti-theft alarm systems designed to be permanently installed on vehicles with closed compartments in which cargo is stored and/or transported are well-known in the art. Such systems include electronic components situated within housings physically attached to structural members of a vehicle and hard wired to the electrical system of the vehicle for power. Such systems are commonly connected to magnetic sensors or sensors with spring-loaded depressible parts mounted in door jams associated with the access doors to the cargo compartment. The alarm system may also be hard wired to the ignition system of the vehicle to prevent the engine of the vehicle from being started upon detecting unauthorized entry to the cargo compartment or other door of the vehicle.

Currently, the only portable security devices available on the market to protect vehicle cargo are padlocks. However, padlocks can be circumvented relatively easily and do not provide the level of security required by commercial cargo storage and transport vehicles.

Permanently installed anti-theft alarm systems tend to be less vulnerable to attack but are not suitable for all purposes. Shippers that do not have a dedicated fleet of cargo transport vehicles need to be able to secure the cargo stored and transported in vehicles which are sometimes used to perform other tasks. Moreover, shippers may at times employ third party carriers which do not have installed anti-theft systems or have installed anti-theft systems which are not sufficiently robust to adequately protect the cargo being stored or transported.

The portable alarm system of the present invention includes sensors that monitor the light level and movement in the vicinity of the alarm housing. However, those sensors are quite sensitive and may provide a false alarm as a result of shifting cargo in the cargo compartment resulting from the movement of the vehicle and vibrations created by irregular road surface conditions, as the vehicle moves from one place to another. In order to avoid such false alarms, the present invention is provided with a mobile transmitter which functions as a proximity detector. The proximity detector output signal prevents activation of the sensors, and thus the generation of an audible alarm and GPS location signal, when the driver of the vehicle is in the vicinity of the vehicle. However, when the proximity signal indicates that the driver with the transmitter has left the vehicle unattended, and one or more of the sensors is triggered by an increase in the light level or movement of the alarm housing or in the vicinity of the alarm, the audible alarm and GPS signal will be generated.

It is therefore, a prime object of the present invention to provide a portable, self-contained anti-theft alarm system with automatic proximity control which can be placed in and relocated to any vehicle with an enclosed cargo compartment.

It is another object of the present invention to provide a portable, self-contained anti-theft alarm system with automatic proximity control for the cargo compartment of a vehicle which has internal sensors and power supply and does not require any external power or data connections.

It is another object of the present invention to provide a portable, self-contained anti-theft alarm system with automatic proximity control for the cargo compartment of a vehicle which can detect the opening of a cargo access door without the necessity of permanently installed sensors.

It is another object of the present invention to provide a portable, self-contained anti-theft alarm system with automatic proximity control for the cargo compartment of a vehicle which monitors the light in the compartment in which it is located and triggers an alarm when the light in the compartment exceeds a given threshold level, indicating that the cargo access door has been opened.

It is another object of the present invention to provide a portable, self-contained anti-theft alarm system with automatic proximity control for the cargo compartment of a vehicle which monitors movement in the vicinity of the alarm housing and triggers an alarm when motion is detected.

It is another object of the present invention to provide a portable, self-contained anti-theft alarm system with automatic proximity control for the cargo compartment of a vehicle which monitors the position of the alarm housing and triggers an alarm when the housing is tilted beyond a given threshold level, indicating that the alarm housing is being moved.

It is another object of the present invention to provide a portable, self-contained anti-theft alarm system with automatic proximity control for the cargo compartment of a vehicle which includes a GPS unit capable of transmitting a signal when the alarm is triggered indicating the state of the alarm as well as the location of the vehicle in which the alarm is located.

It is another object of the present invention to provide a portable, self-contained anti-theft alarm system with automatic proximity control for the cargo compartment of a vehicle which can be controlled remotely.

It is another object of the present invention to provide a portable, self-contained anti-theft alarm system with automatic proximity control for the cargo compartment of a vehicle which includes a proximity detector that prevents activation of the sensors and GPS when the proximity signal is received.

It is another object of the present invention to provide a portable, self-contained anti-theft alarm system with automatic proximity control for the cargo compartment of a vehicle which prevents false alarms resulting from shifting cargo in the cargo compartment due to movement of the vehicle and vibrations from irregular road surfaces during transit.

It is another object of the present invention to provide a portable, self-contained anti-theft alarm system with automatic proximity control for the cargo compartment of a vehicle which is automatically activated during the times when the vehicle is unattended.

It is another object of the present invention to provide a portable, self-contained anti-theft alarm system with automatic proximity control for the cargo compartment of a vehicle which includes a proximity detector that activates the sensors when the driver of the vehicle moves more than a given distance away from the vehicle.

BRIEF SUMMARY OF THE INVENTION

In general, the above objects are achieved by the present invention which is a portable, self-contained anti-theft alarm system designed for use in the cargo compartment of a vehicle of the type having an access door. The alarm system includes a housing adapted to be situated within the cargo compartment which fully encloses an interior space within which the electrical components of the alarm system are situated. The components create an audible signal in response to the opening of the cargo compartment access door or the tilting of the alarm system housing.

The alarm system components include a central processing unit (CPU) capable of generating an alarm signal output upon the detection of a security breach by any of three types of sensors. The output of a first sensor is connected to a CPU input and provides a first trigger signal to the CPU upon detection of light exceeding a given threshold level in the vicinity of the housing, indicating that the access door to the cargo compartment has been opened. The output of the second sensor is connected to another CPU input and provides a second trigger signal to the CPU upon detection of motion in the vicinity of the alarm. The output of a third sensor detects the tilting of the alarm housing and provides a third trigger signal to the CPU upon detection of tilting of the housing exceeding a given threshold level. The CPU generates the alarm signal output in response to receiving any of the second trigger signals.

A sound generator in the form of a siren or speaker is connected to a CPU output. It generates the audible signal in response to the alarm signal output.

The alarm components also include a GPS unit connected to a CPU output. The GPS unit is capable of wirelessly transmitting a GPS signal in response to the alarm signal output, indicating the triggered state of the alarm and the location of the housing.

A power source situated within the housing is connected to energize the electronic alarm system components. A master power switch connects the power source to the alarm system components.

The alarm system also includes a hand-held mobile transmitter for remotely controlling the state of the alarm system. The transmitter (or a separate mobile transmitter) functions as a proximity detector which communicates with a receiver connected to the CPU and allows the sensors to be activated only when the individual possessing the transmitter, usually the driver of the vehicle, has moved to a location outside the immediate area of the vehicle, that is, the vehicle is unattended.

The alarm has a key activated disarm switch accessible of the exterior of the housing for arming and disarming the alarm system.

The internal power source preferably consists of one or more batteries. The batteries are preferably rechargeable. The alarm system includes a circuit for recharging the batteries when the alarm system is not in use.

The alarm system housing is a metal box formed of four side walls, a top wall and a bottom wall.

The alarm system housing also has one or more handles for facilitating manual transport of the alarm system from one vehicle cargo compartment to another.

The alarm system housing has a wall proximate the audio signal generator. One or more sound vents in the housing wall are provided such that sound can travel from the audible signal generator the interior of the housing can exit the housing.

The alarm system is armed in response to energizing the light and tilt sensors.

The alarm has an externally accessible, key actuated disarm switch. The alarm is armed in response to the sensors being energized, if the externally accessible key actuated switch is in the "arm" position. The alarm is automatically re-armed in response to energizing the sensors, as long as the externally accessible key actuated switch is in the "arm" position.

BRIEF DESCRIPTION OF THE SEVERAL VIEWS OF DRAWINGS

To these and to such other objects that may hereinafter appears, the present invention relates to a portable, self-contained anti-theft alarm system for the cargo compartment of a vehicle with automatic proximity detector as described in detail in the following specification and recited in the annexed claims, taken together with the accompanying drawings, in which like numerals refer to like parts and in which:

DETAILED DESCRIPTION OF THE INVENTION

Figure 1:
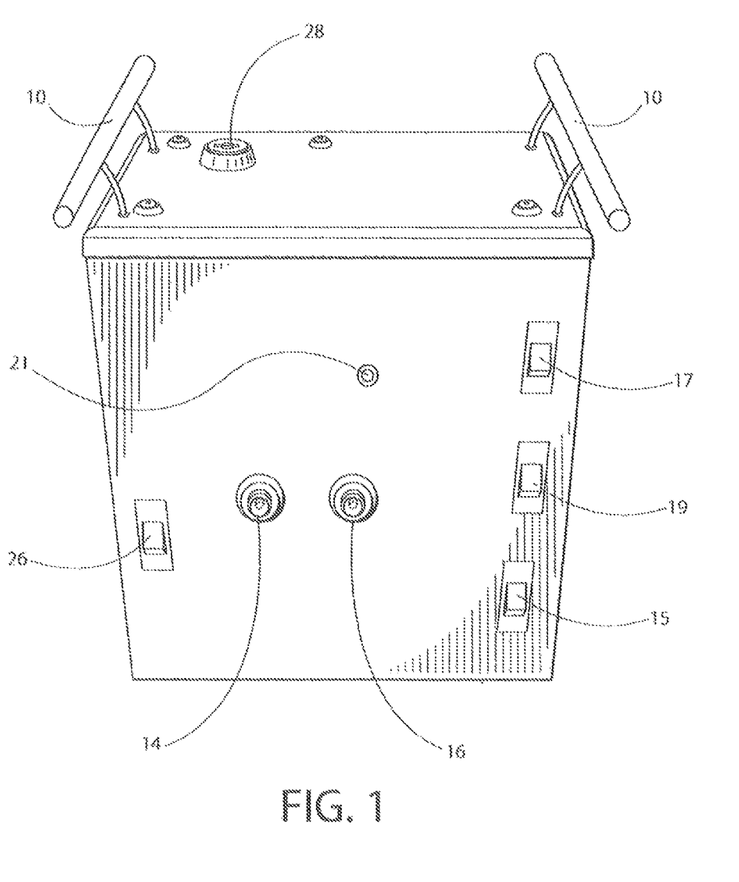
FIG. 1 is a front elevation view of the housing of the present invention showing the sensors and switches.

The electronic components of the alarm system of the present invention are situated entirely within a metal box-like housing, generally designated A, as illustrated in FIG. 1. Housing A includes four side walls, a top wall and a bottom wall so as to fully enclose all of the electronic components of the alarm system. The housing is designed to be portable and easily moveable from one location to another. No external power or data connections are required for the alarm system to operate.

Several handles 10 are attached to and extend from the exterior of the housing. The handles are provided to facilitate manual transport of the alarm system between locations.

To make the alarm system portable, all of the electronic components are situated entirely within housing A. The alarm system is self-contained because it does not require any wire connections to external power sources or data signal input from external sensors during operation. The alarm system also does not require any wire connection to an external sound generator or a communications device. The only external connection employed is to an A.C. power source used to recharge the internal batteries between uses of the alarm system, when necessary, as explained below.

Figure 2:
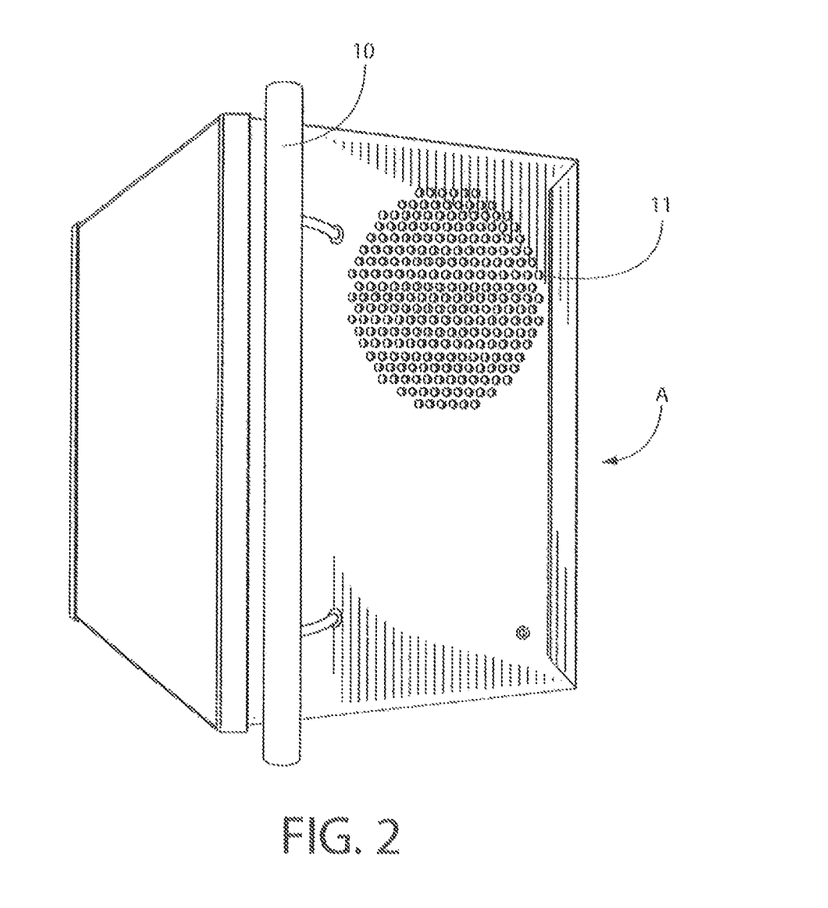
FIG. 2 is a side view of the housing of the present invention showing the sound vent and grill.

As illustrated in FIG. 1, the various switches which control the functions of the components can be accessed from the exterior of the housing. As illustrated in FIG. 2, on housing side wall has a pattern of vent openings 11 situated proximate an internally mounted siren or speaker component 12 such that the sound generated by the component can exit the housing without substantial degradation.

FIG. 1 shows two openings formed in the housing side wall in alignment with the light sensor 14 and motion sensor 16, respectively. The openings are provided such that the light sensor 14 can detect changes in the light level within the vicinity of the alarm system housing and motion sensor 16 can detect motion within the vicinity of the alarm system housing or motion of the vehicle.

A tilt sensor 18 is also situated within the housing. Sensor 18 will detect the tilting of the alarm system housing if there is an attempt to move the housing or remove the housing from the cargo compartment in which the alarm system is located. Tilt sensor 18 does not require an opening in the housing side wall to function.

Toggle switches for turning each of the sensors 14, 16 and 18 on and off are accessible from the exterior of housing A and located on the side wall of the housing. Switch 15 controls the operation of light sensor 14. Switch 17 controls the function of motion sensor 16. Switch 19 controls the function of sensor 18.

The alarm system is designed to protect cargo in an enclosed vehicle compartment having an access door, particularly when the vehicle is unattended. Once situated within the cargo compartment and armed, if the driver carrying a transmitter leaves the immediate area of the vehicle, the alarm system can generate an audible signal and/or wirelessly transmit a signal indicating that the alarm system has been triggered and the location of the housing, upon the detection of unauthorized opening of the vehicle cargo compartment access door, movement in the vicinity of the housing, tilting of the housing or movement of the vehicle in which the alarm system is located.

The alarm system requires no connections to external sensors to function as all of the necessary sensors are contained within housing A. Accordingly, the alarm system is designed to be easily moved and relocated from the cargo compartment of one vehicle to the cargo compartment of another vehicle, as needed.

Figure 3:
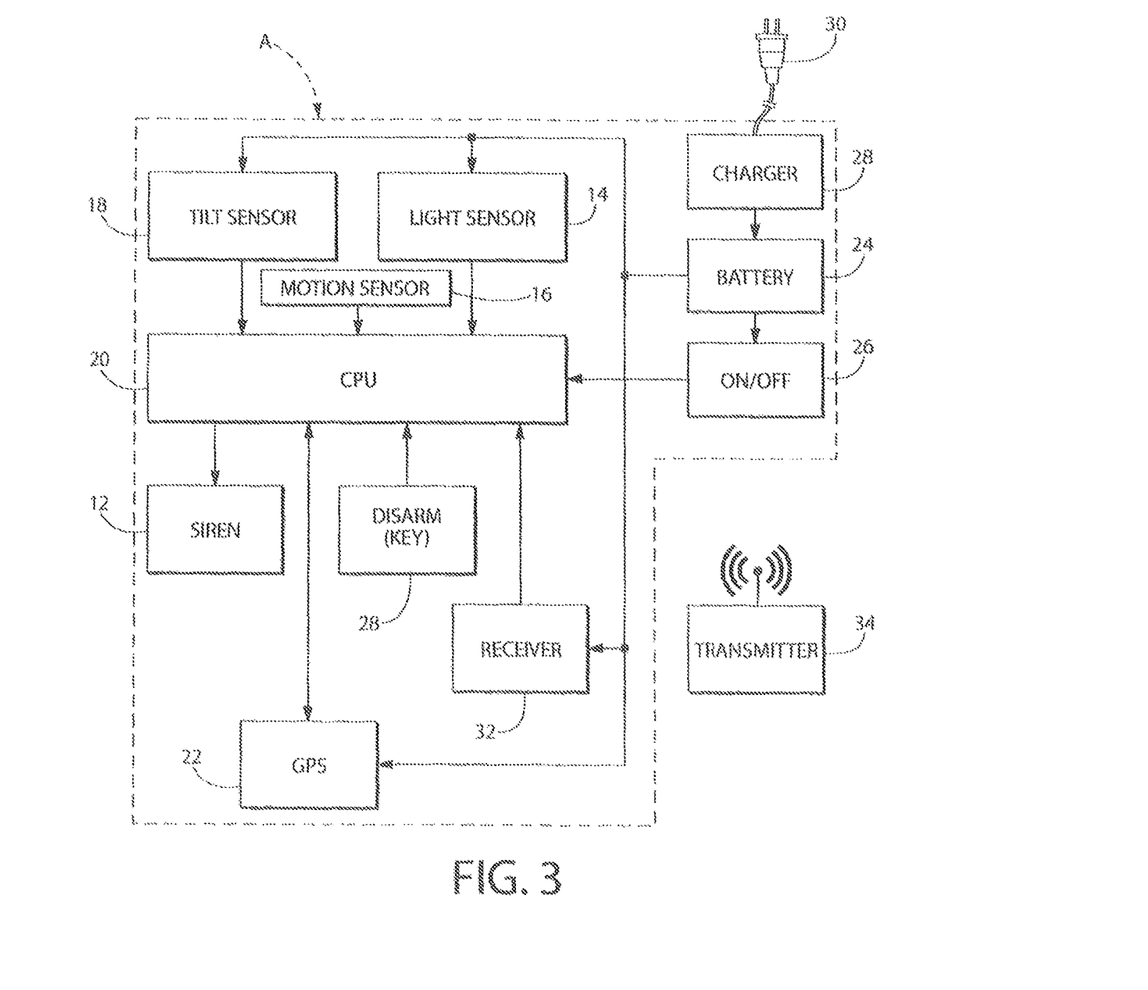
FIG. 3 is a block diagram of the electronic components of the present invention.

As illustrated in the block diagram of FIG. 3, the components of the alarm system located within housing A include a central processing unit (CPU) 20 which controls all of the functions of the system. The CPU is capable of generating an alarm signal output in response to a trigger signal output from light sensor 14, motion sensor 16 or tilt sensor 18 once the sensors have been activated.

CPU 20 can be a PIC16F1784 28 pin 8-bit Advanced Analog Flash MCU of Chandler, Ariz. or the equivalent thereof.

The output of light sensor 14 is connected to one of the CPU inputs. Sensor 14 provides a first trigger signal to the CPU upon detecting light exceeding a given threshold level within the cargo compartment in which the housing is situated, indicating that the door to the cargo compartment has been opened.

Light sensor 14 may be any commercially available light sensor with sufficient sensitivity. A sensor that works acceptably in this alarm system is available from Sure Action Inc. of Hampton Bays, N.Y.

The output of motion sensor 16 is connected to another of the CPU inputs. Sensor 16 provides a second trigger signal to the CPU upon detecting motion in the vicinity of the alarm system housing or movement of the vehicle in which the alarm system housing is located.

Motion sensor 16 can be a SPY1 wired detector available from Visonic Ltd. of Tel Aviv, Israel.

The output of a tilt sensor 18 is connected to a third CPU input. Sensor 18 provides a third trigger signal to the CPU upon detecting the tilting of the housing exceeding a given threshold level, indicating that the housing is being moved.

Tilt sensor 18 may take the form of Part #20144 from International Sensor Controls, Inc. of Sandy Hook, Conn. or an equivalent product.

As noted previously, internal sensors 14, 16 and 18 are controlled by externally accessible toggle switches 15, 17 and 19, respectively. However, switches 15, 17 and 19 are not illustrated in FIG. 3.

When the system is armed, if the vehicle is unattended, CPU 20 will generate an alarm signal in response to either the first trigger signal from light sensor 14, the second trigger signal from the motion sensor 16, or the third trigger signal from the tilt sensor 18. A sound generator 12 in the form of a siren or speaker is connected to an output of the CPU. Siren/speaker 12 generates an audible signal in response to the alarm signal output of the CPU. The audible signal from the sound generator is loud enough to be heard at considerable distance.

A pilot light 21 is located on the side wall of housing A. The pilot light allows one to observe the housing and determine if the power of the alarm system is on.

A GPS unit 22, including a wireless transmitter, is also situated within housing A. The GPS unit is connected to receive the alarm signal output of the CPU. Unit 22 is capable creating and wirelessly transmitting a transmit signal in response to the alarm signal output. The transmit signal indicates the triggered state of the alarm and the location of the housing when the triggered state occurs.

Also included within housing 10 is a power source 24 connected to energize the alarm system components. Power source 24 is connected to the alarm system components through a master power switch 26. Switch 26 is accessible from the exterior of the housing.

A key activated "Disarm" switch 28 is connected to the CPU and is also accessible from the exterior of the housing. Switch 28 is provided to arm and disarm the alarm system and requires a key to do so.

Preferably, power source 24 includes one or more rechargeable batteries. A charging circuit 28 is provided within housing A. Circuit 28 is connected to the batteries which form power source 24 and to an external plug 30. Plug 30 can be inserted into any standard 120 v A.C. wall outlet to recharge the batteries between uses of the alarm system.

Also included within housing A is a wireless RF receiver 32. The RF signal receiver is connected to an RF antenna through a port in alarm housing A.

The output of receiver 32 is connected to an input of the CPU. Receiver 32 is wirelessly connected to a hand-held, mobile transmitter 34, which may take the form of a key fob, and preferably has 16 bit RF encryption so that it provides a secure means of controlling the alarm system remotely. By manipulating pushbuttons on transmitter 34, the alarm system can be remotely controlled to arm and disarm the system or to silence an audible alarm.

Transmitter 34 also acts as a proximity detector. The transmitter will continuously generate a proximity signal indicating a given range. The range indicated by the proximity signal can be adjusted. If a transmitter with an analog output is used, the range can be adjusted by regulating the power of the transmitter output. If a transmitter with a digital output is used, the content of the signal is altered to the change in the range. The range can be set, for example, at 50 yards.

As long as the transmitter is within the set range of the alarm in the vehicle, the proximity signal received by receiver 32 will indicate that the vehicle is attended. Under those conditions, the alarm signal from the CPU will be suppressed and the sensors will not be activated.

However, when the transmitter is situated outside of the set range because the driver carrying the transmitter has left the immediate area of the vehicle, the proximity signal will no longer indicate that the transmitter is within range. In that event, the alarm signal from the CPU will no longer be suppressed and the audible alarm and GPS unit will be energized if the sensors are triggered by increased light or motion in the vicinity of the alarm housing or tilting of the alarm housing.

With this system, the alarm sensors should never be activated when the vehicle is being driven by an authorized driver that has the transmitter in his possession because the driver (and thus the transmitter) will be within the set range and the proximity signal will indicate that the transmitter is within range. As a result, shifting cargo within the cargo compartment caused by the motion of the vehicle and vibrations due to road surface irregularities during transit will not trigger the alarm.

The transmitter continuously transmits the RF proximity signal in bursts at regular intervals. The signal transmitted may be pulsed or digitized. Preferably, the signal is a digitized signal containing discrete data sets, or is a digitized coded signal. The RF receiver is capable of receiving the pulsed or digitized proximity signal and for converting it to an electrical signal which is then sent to the CPU for further processing.

The portable RF transmitter is a battery operated RF transmitter that once activated, continuously transmits the proximity signal at regular intervals on frequencies that can be used for commercial security purposes, preferably at or around 433.92 MHz. However, signals in the gigahertz frequency range may also be used. For the sake of convenience and ease of use, the transmitter is preferably compact and light enough to be carried on a key ring by a person or in the person's pocket.

Figure 5:
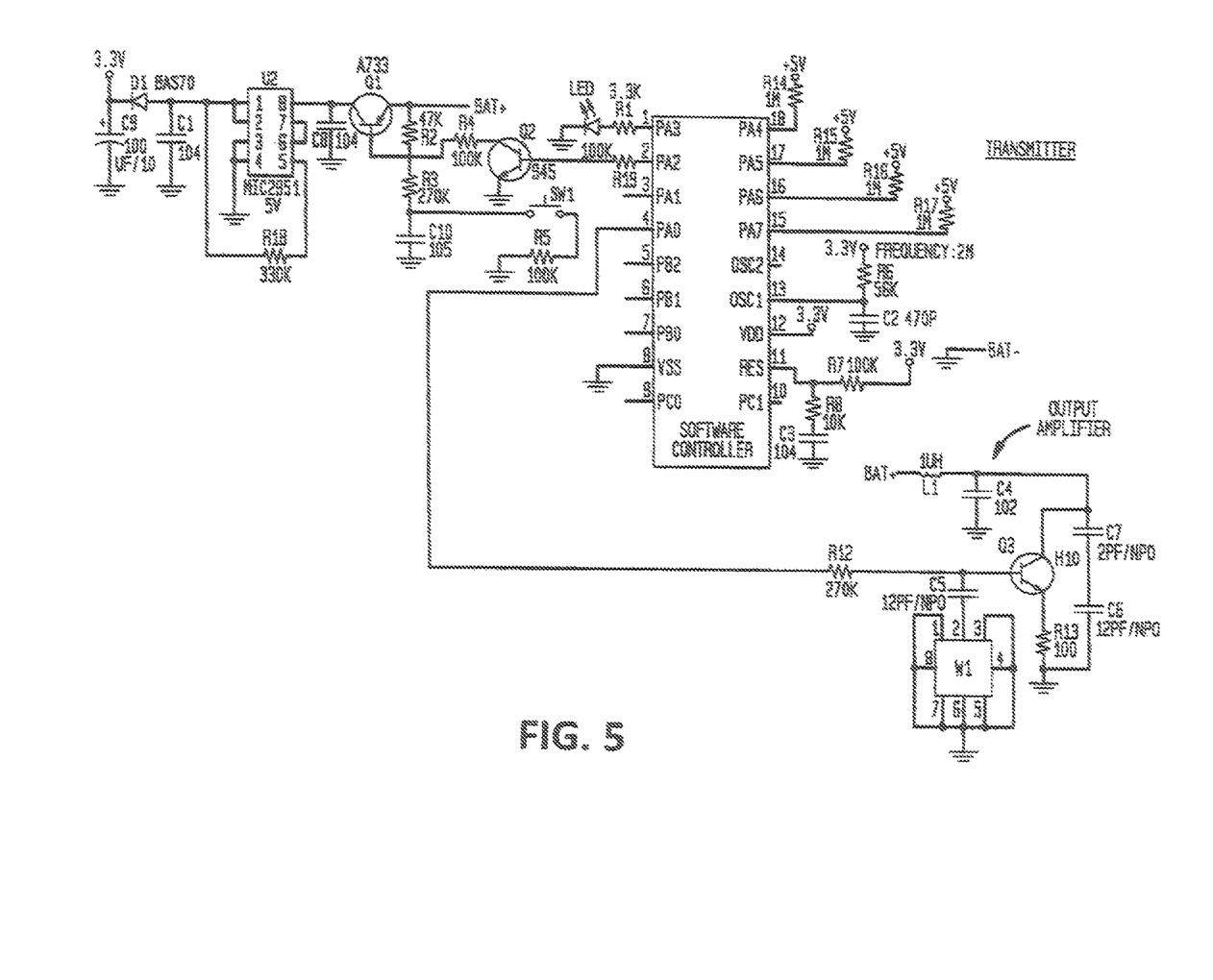
FIG. 5 is a schematic diagram of the system transmitter.

FIG. 5 shows a preferred embodiment of RF transmitter 34. It includes a battery selected from commercially available disposable or rechargeable batteries. Such batteries have an output voltage of from 1.5 to 12 volts, as required by any particular embodiment of the transmitter, preferably 12V to permit maximum transmitter range.

The transmitter also has a PC board which includes power management circuitry, a CPU and output amplifier circuitry, an activation and function control button, and a LED to indicate activation and on/off status.

The finite transmission range or output of the portable RF transmitter permits it to function as the proximity detector component of the security system. The range of the transmitter is from about zero to about 70 yards, preferably from about 10 yards to about 60 yards, and most preferably from about 20 yards to about 50 yards. The range is preferably continuously adjustable by standard means known in the art, such as by changing the power output or the content of the digital output.

The RF transmitter is easily carried or worn by a person, for example, by the driver of the vehicle. It transmits automatically, that is, once activated, it continuously transmits a digitized proximity signal at regular time intervals. The RF receiver receives the proximity signal transmitted from RF transmitter, as long the transmitter is within range of the receiver.

The transmitted proximity signal preferably comprises groups of pulses having a regular and constant interval of time between each group of pulses. Typically, it is a digitized signal containing sets of data. Multiple sets of data are transmitted with each transmission burst or pulse. Each transmission burst or pulse contains from about 1 to about 10 sets of data, preferably about 3 sets of data, with each set of data including from 1 to 5 bytes, preferably 3 bytes.

Preferably, the transmitter sends a proximity signal burst or pulse about every 4 seconds to about every 12 seconds, preferably about every 6 seconds to about every 10 seconds and most preferably about every 8 seconds, the burst or pulse containing at least 3 sets of data with each set of data including 3 bytes.

That transmission pattern enables the transmitter to overcome certain RF transmission conditions encountered in practice, during a cargo pick up or delivery, that may interfere with signal reception by the receiver, which is programmed to cause the CPU to generate an alarm signal if a minimum of one data set (3 bytes) is not received within a preset time period.

The RF receiver provides output signals to the CPU which includes a clock or timing means, preferably timer circuitry, to time the interval of time between groups of pulses in the received proximity signal. Typically, the timing means is set so that the digitized or pulsed signal from the RF transmitter must be detected at least once in an interval of about 8 to about 11 seconds, preferably at least once in an interval of about 9 to about 10 seconds, to prevent an alarm signal being generated by the CPU.

The CPU alarm signal output activates the sensors when the timing means indicates that the interval of time between groups of pulses received by receiver exceeds a preset or fixed value that is about equal to the interval of time between the transmitted groups of pulses. Once the sensors are activated, if the alarm is triggered by sensor output indicating tilting, motion or light detection, the GPS unit 22 sends its position signal and the audible alarm is energized.

In this manner, a person such as the driver working on the vehicle and carrying the RF transmitter is alerted by an audible alarm if they have gone too far from the vehicle and movement of the alarm housing, motion or light in the vicinity of the alarm housing is detected. The system may be programmed such that by moving closer to vehicle so that RF receiver is within range of portable RF transmitter, the condition that caused the audible alarm will be eliminated and the audible alarm will be halted because the timing means within the CPU will again detect groups of transmitted pulses having a time interval between them that is about equal to or less than said preset value. Alternatively, the system may be programmed to cause the alarm to continue to sound until the system is disarmed by depressing a button on the transmitter or by manipulation of the key on the unit housing.

A battery powered portable RF transmission means 34 must be worn or carried by at least one person, preferably the driver, working on the vehicle.

Figure 6:
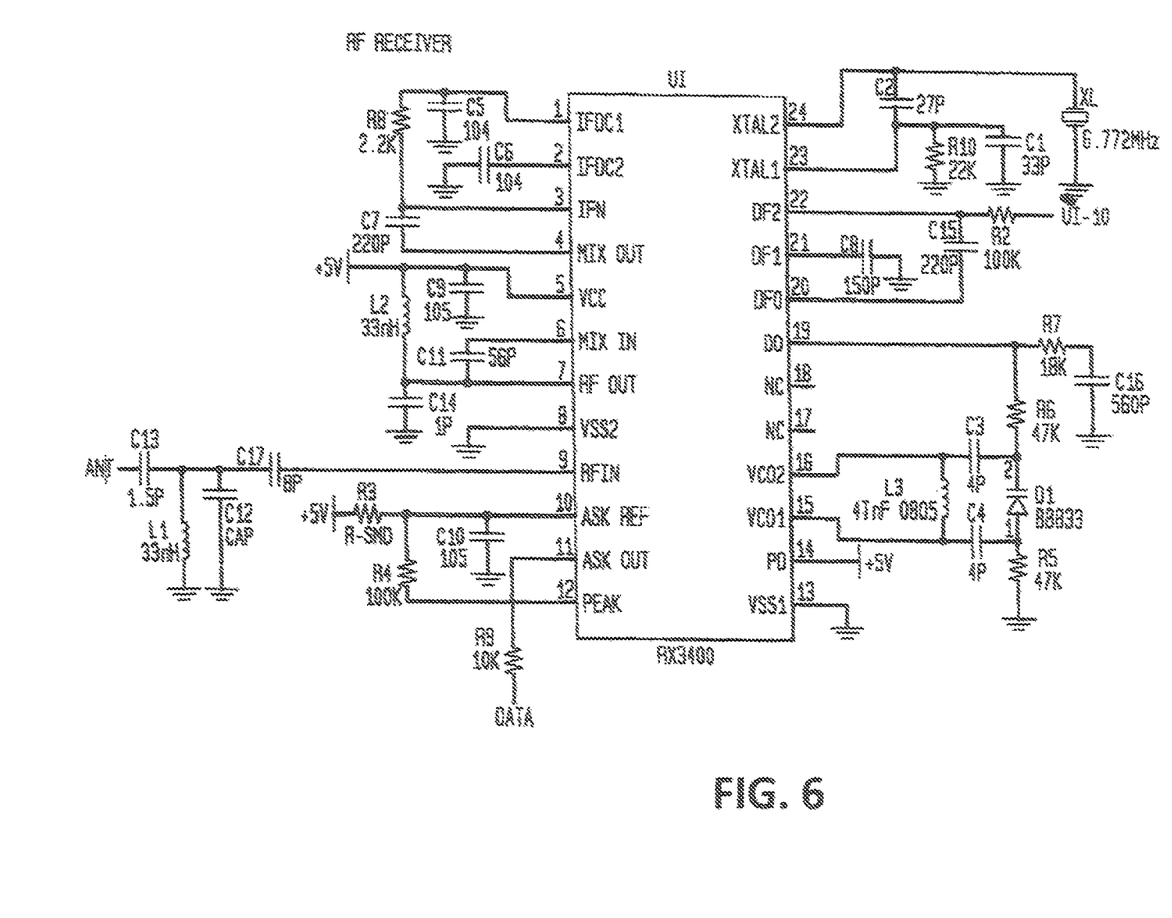
FIG. 6 is a schematic diagram of the system receiver.

The electronic circuitry of RF signal receiver 32 is depicted in the schematic diagram of FIG. 6.

The alarm system of the present invention is situated within the enclosed cargo compartment of a vehicle of the type having an access door. Preferably, the alarm system housing is placed in the vicinity of the access door such that the internal light sensor can detect changes in light level in the vicinity of the housing resulting from the opening of the access door. Before arming the system, the access door is closed.

With the "Disarm" switch 28 in the "arm" position, the sensors 14, 16 and 18 are each turned "on" by toggle switches 15, 17 and 19, respectively, which are accessible from the housing exterior. The master power switch 26, also accessible from the exterior of the housing, is then turned "on."

Figure 4:
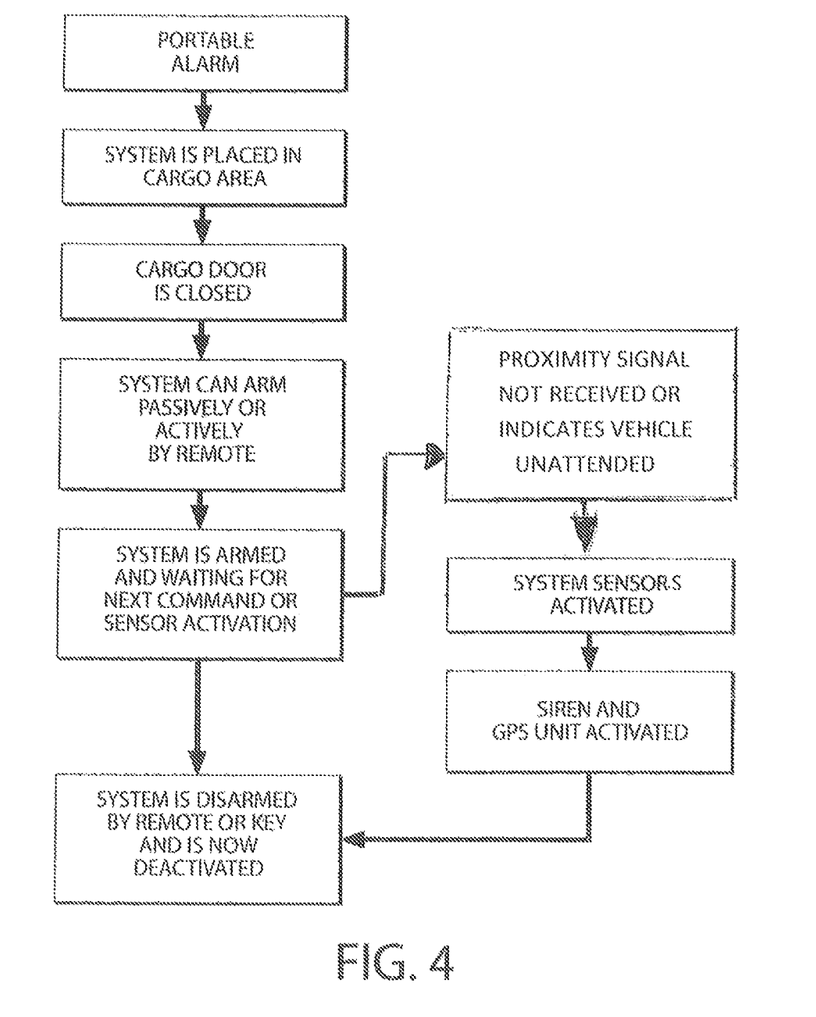
FIG. 4 is a flow chart of the operation of the present invention.

The system "beeps" once indicating that it is armed, if the proximity signal is being received. If the alarm system continues "beeping" that indicates that it there is too much light in the vicinity of the housing for the light sensor to activate and that the housing should be relocated to a position within the cargo compartment where there is less light so the alarm system can be successfully armed. Alternatively, the system can be armed remotely using the hand-held transmitter 32. Thus, the system is automatically armed in response to the sensors being turned "on", if the power is on, the proximity signal is being received and the externally accessible "Disarm" switch is in the "arm" position.

Once armed, if the proximity signal stops being received, and the light sensor 14 detects light exceeding a pre-set threshold level, the motion sensor detects motion, or the tilt sensor detects that the housing is tilted beyond a pre-set threshold level, the CPU will generate the alarm signal output to siren/speaker 12 which will broadcast a very loud sound, and to the GPS unit 22, which will wirelessly transmit a signal to a remote location, such as a monitoring station, indicating the state of the alarm ("triggered") and the location of the vehicle in which the alarm system is situated.

The alarm can be silenced by the transmitter returning to a location within range of the vehicle such that the proximity signal is again receiver or by depressing the appropriate button on the hand-held transmitter 34, depending upon the programming of the system, or by setting the "Disarm" switch 28 to the "disarm" position. The alarm will automatically re-arm once the "Disarm" switch is moved to the "arm" position and the sensors clear and activate.

To relocate the alarm system, either to a place where the batteries can be recharged or to another vehicle cargo compartment, the sensors are each turned "off" or the "Disarm" switch is moved to the "disarm" position or power is turned off through the master power switch.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A portable, self-contained anti-theft alarm system for use in an enclosed cargo compartment of a vehicle, the alarm system comprising a mobile transmitter for generating a proximity signal within a given range of the vehicle and a housing configured to be situated within the vehicle cargo compartment without any external power or data connections with the vehicle and enclose the alarm system components, said alarm system components comprising one or more on-board sensors monitoring conditions in the cargo compartment in the vicinity of the housing and, when activated, providing a trigger signal upon detection of a change in the monitored conditions, including motion of the vehicle, a central processing unit (CPU) configured to generate an alarm signal in response to said trigger signal, and a receiver connected to said CPU for receiving said proximity signal, if said housing is within said given range, said on-board sensors being activated only when said proximity signal is not being received by said receiver.

2. The alarm system of claim 1 wherein said alarm system has a triggered state and wherein said alarm system components further comprise a GPS unit configured to ascertain the location of said housing, connected to said CPU and configured to wirelessly transmit a GPS signal in response to said alarm signal indicating said triggered state of the alarm system and the location of the housing, unless said proximity signal is being received by said receiver.

3. The alarm system of claim 1 further comprising a power source and a master power switch connecting said power source to said alarm system components.

4. The alarm system of claim 1 wherein said mobile transmitter is configured to remotely control alarm operation.

5. The alarm system of claim 1 further comprising a key activated switch accessible of the exterior of said housing for arming and disarming the alarm system.

6. The alarm system of claim 1 wherein said housing is a metal box comprising four side walls, a top wall and a bottom wall.

7. The alarm system of claim 1 wherein said housing comprises a handle for facilitating transport of the housing.

8. The alarm system of claim 1 further comprising an audible signal generator wherein said housing comprises a wall proximate said audible signal generator and one or more vent openings in said housing wall for sound to travel from the interior of the housing to the exterior of the housing.

9. The alarm system of claim 1 wherein the alarm system is armed in response to energizing one of aid on-board sensors.

10. The alarm system of claim 1 further comprising an externally accessible, key actuated Disarm switch.

11. The alarm system of claim 10 wherein the alarm system is armed in response to said on-board sensors being turned on, if said key actuated Disarm switch is in an arm position.

12. The alarm system of claim 10 wherein the alarm system is automatically re-armed in response to turning on said on-board sensors, after said on-board sensors have been de-energized.

13. The alarm system of claim 1 wherein said trigger signal is generated upon sensing the tilting of said housing.

14. The alarm system of claim 1 wherein said trigger signal is generated upon sensing motion in the vicinity of said housing.

15. The alarm system of claim 1 wherein said trigger signal is generated upon sensing an increase in the light level in the vicinity of said housing.

16. The alarm system of claim 1 wherein said one or more on-board sensors includes a light sensor.

17. The alarm system of claim 1 wherein said one or more on-board sensors includes a motion sensor.

18. The alarm system of claim 1 further comprising a tilt sensor attached to said housing.

* * * * *